United States Patent [19]

Hunter

[11] 4,149,570
[45] Apr. 17, 1979

[54] NONLINEAR SENSOR FOR CENTER PIVOT DRIVE CONTROL SYSTEM

[75] Inventor: Richard E. Hunter, Greeley, Colo.

[73] Assignee: The Toro Company, San Marcos, Calif.

[21] Appl. No.: 864,396

[22] Filed: Dec. 27, 1977

[51] Int. Cl.² ............................................... B05B 3/12
[52] U.S. Cl. .................................. 137/344; 239/177; 239/212
[58] Field of Search ................ 137/344; 239/177, 212, 239/213

[56] References Cited

U.S. PATENT DOCUMENTS 4,085,771   4/1978   Hunter ................................ 137/344

Primary Examiner—Gerald A. Michalsky
Attorney, Agent, or Firm—Poms, Smith, Lande, Glenny & Rose

[57] ABSTRACT

The present invention discloses an improvement in angularity sensors employed in center pivot irrigation systems. A center pivot irrigation system has a plurality of self-propelled articulating span units mounting interconnected sections of water carrying conduit, each span unit has motor means and motor control means for regulating the operation of the associated motor means to maintain the span units in a pre-determined relative alignment in a vertical plane revolving about a vertical line at the center pivot of the system. The control means has angularlity sensor means which is connected between span units for sensing in a substantially horizontal plane changes in angularity between the span units relative to the desired revovling vertical plane. According to the present invention, the angularity sensor means incorporates a flexible control rod connected to an actuator rod of the motor control means allowing linear actuation of the motor control means over a first portion of travel of the control rod and being rotatably stopped at a free end thereof to cause flexure of the control rod and, thereby, non-linear actuation of the motor control means over a second portion of the movement of the control rod.

9 Claims, 8 Drawing Figures

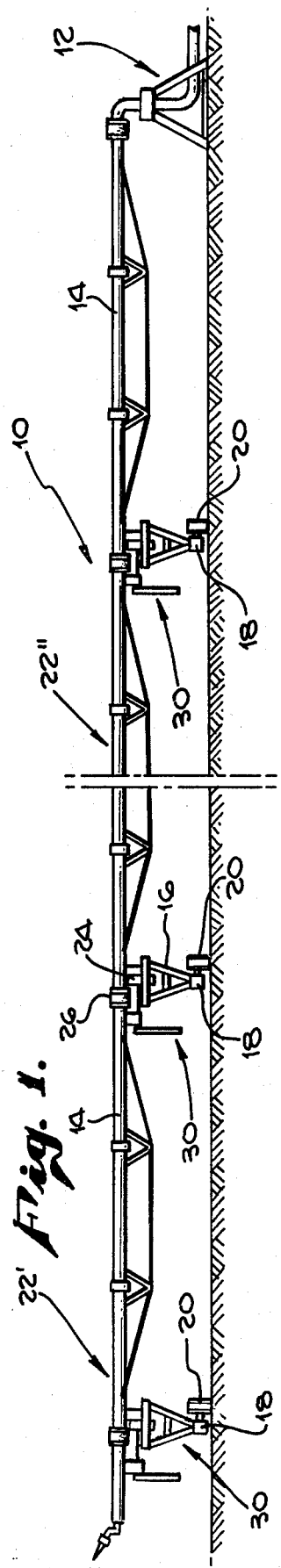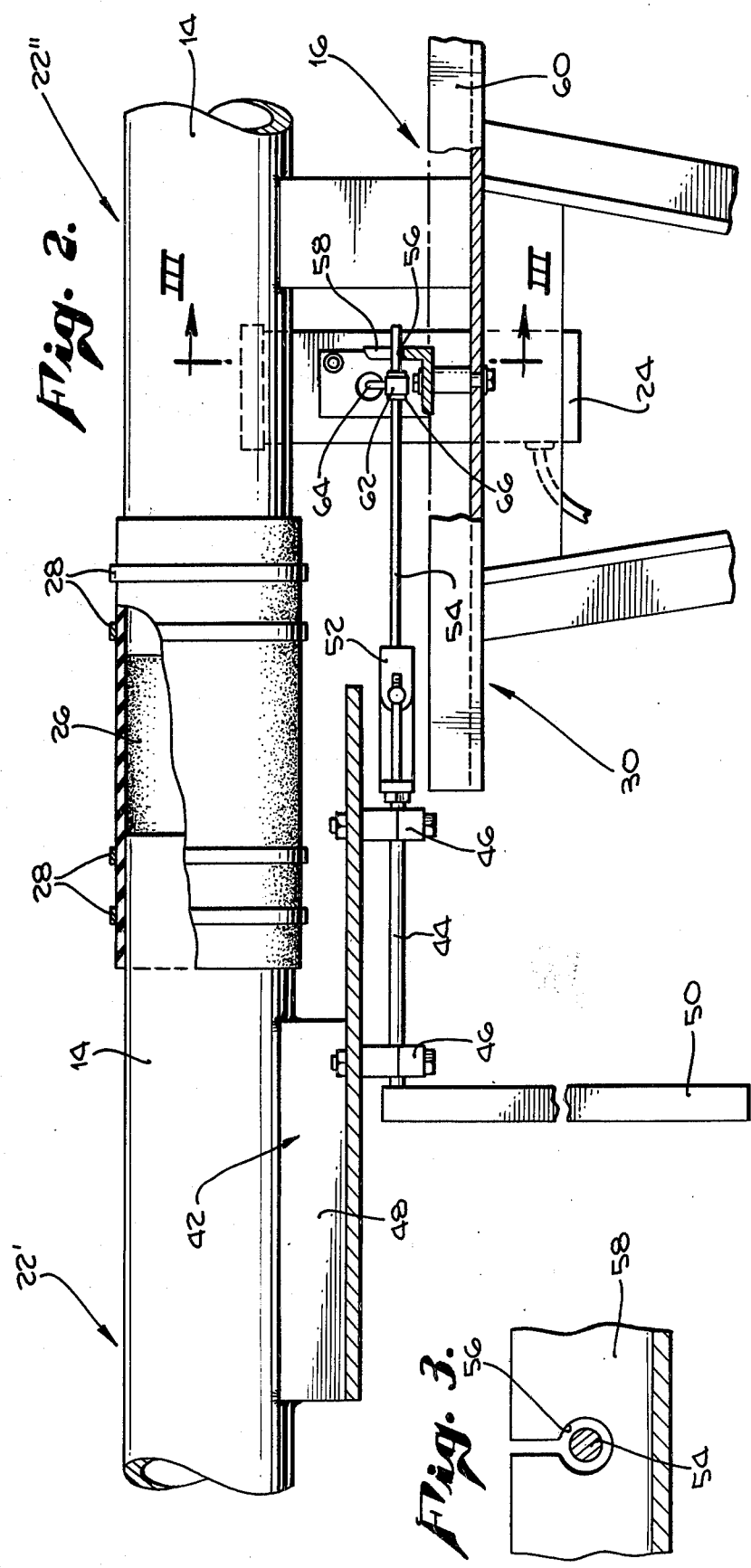

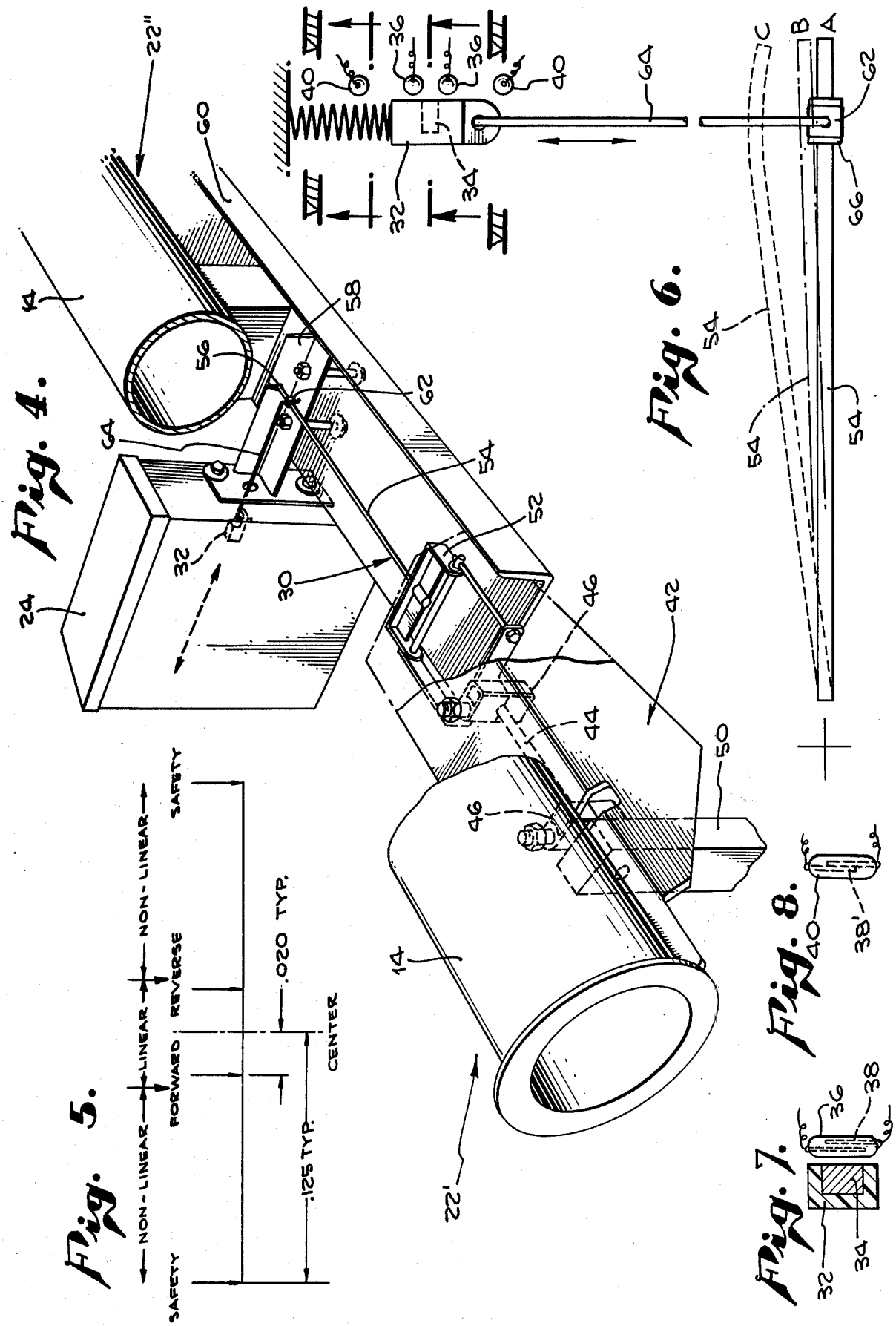

NONLINEAR SENSOR FOR CENTER PIVOT DRIVE CONTROL SYSTEM

BACKGROUND OF THE INVENTION:

The present invention relates in general to self-propelled center pivot irrigation systems which are comprised of a plurality of self-propelled articulated span units which mount interconnecting sections of water carrying conduit, each such span unit having drive motor means and motor control means which regulate the operation of the drive motor means to maintain the span units in pre-determine relative alignment. In particular, the present invention relates to the control means which regulate the operation of the drive motor means.

The preferred relating alignment for the individual span units of the system is accomplished when the units are in essentially a straight longitudinal array with the individual units revolving about the center pivot of the system aligned in an imaginary true vertical plane revolving about an imaginary truly vertical line located co-axial with the systems center pivot. "True vertical" as used herein is the indication of vertical as provided by a so called "spirit" level or a plumbbob suspended on a plumb line, i.e. truly vertical as to the gravitational center of the earth.

The flexure junction between adjacent span units is provided with angularity sensor means providing an input to the motor control means. An early example of such apparatus is disclosed in the U.S. Pat. No. 3,394,729 to C. D. Bower et al wherein a cord is fastened at both ends to one span unit and passed around a shaft on the next adjacent unit. Changes in angular relationship between the two units cause the shaft to be rotated by the cord. As the shaft rotates, appropriate switch means are actuated to cause the desired signal input to the motor control means. As can be seen, such apparatus results in an linear response over the complete field of angularity movement between adjacent span units.

In later adaptations of such control apparatus, it has been common to connect a sensor arm to one span unit and to have the sensor arm operationally interact with a motor control actuator mechanism of an adjacent span unit. It has been found in these prior embodiments that the use of a rigidly mounted sensor arm measures changes in angularity in a plane perpendicular to the vertical plane of its unit only and can thus transmit spurious signals to the motor control actuator mechanism when the self-propelled irrigation system traverses an uneven terrain. An improvement in such apparatus is shown in copending United States patent application No. 731,695 now Pat. No. 4,085,771, entitled "Angularity Sensor Means For Center Pivot Irrigation System" by Edwin J. Hunter and assigned to the common assignee of this application. In such apparatus, provision is made for maintaining the sensing apparatus in a position normal to the earth's gravitational pull thereby making the angularity sensor responsive to changes in angularity between the span unit relative only to the true horizontal plane. While the apparatus of the afore-mentioned copending application has successfully met its desired objectives, the use of a rigid sensor arm as incorporated therein provides certain limitations as to switch placement within the motor control means particularly as wherein a more compact structure is desired.

More specifically, such motor control apparatus as employed in many articulated sprinkler systems employs a pair of switches connected in series between the motor and its source of power for each direction of travel. The motor control means of the span unit furthest from the center pivot is made to operate the motor means driving the span unit on a continuous basis. As the angularity between this unit and the next adjacent span unit increases, a first position will be reached wherein the two span units are out of angularity alignment tolerance. At this point, a first normally opened switch is closed causing the motor control means to actuate the motor means to drive the span unit next adjacent the outside unit to "catch-up" to the outside unit. When the second unit is within angularity tolerance, the normally opened switch is once again opened in response to changes in the angularity sensor means. This action continues seriatim from each span unit to the next adjacent span unit closer to the center pivot with each outbound unit acting as a master to the next more interior unit which respond as a slave unit to its master. Each motor control unit means additionally contains a second normally closed switch which is a safety switch. Should the angularity between any two adjacent span units increase beyond the first position to a second position wherein the angularity between the two units is deemed to have reached a safety limit, the angularity sensing means activates the second switch to open it and, thereby, disable power to all the span units.

Typically, in such apparatus, the aforementioned sensor arm is connected to an actuator rod which moves an actuator element longitudinally within the motor control means to actuate switches therein. The changes in angularity between adjacent span units required to cause actuation of the first switch position causing "catch-up" action to be taken is typically less than 1 degree. If spacing of the switches and corresponding dimensioning of the sensor arm and control arm are such as to prevent spurious actuation of the switch from normal movement of the span units over the terrain to be irrigated, the distance to be travelled by the switch actuator between the first position switch and the second position switch can become extraordinarily large. If the motor control means is adapted to operate in both directions i.e. forward and reverse, actuation switches and safety switches must be provided in both directions. The distance in such case between the two safety switches at extreme opposite ends of the travel of the switch actuator can be considerable. The housing for the motor control means containing such switches and actuator must, of course, be large enough to accommodate the length of travel of the components therein.

Wherefore, it is the object of the present invention to provide an improved motor control actuator being resistive to spurious signal generation while maintaining a relatively short distance of travel between actuating positions.

SUMMARY OF THE INVENTION

The foregoing objectives have been met in the apparatus of the present invention wherein the switches actuated by the movement of the control arm are reed type switches and the actuator contains magnet means for actuating the reed switches. Additionally, a control arm is mounted on the adjacent span unit flexible over the length thereof in a horizonal plane, spring biased to a normal position, and having a free end; means for attaching the actuator rod to the control arm are disposed intermediate the point of mounting the control arm and the free end thereof; and stop means are mounted on the span unit for pivotally stopping the movement of the free end at the point in the horizontal travel thereof in response to horizontally angular displacement between adjacent units beyond which non-linear movement of the actuator rod is desired in response to continued horizontal angular displacement between the units.

More particularly in the preferred embodiment shown, the motor control actuator means comprises an actuator rod connected to the motor control means to operate the latter by moving between a first position wherein the power to the motor means is off, a second position wherein power to the motor means is off, and a third position wherein power to the motor means of all span units is disabled, the aforementioned positions being associated with the angularity only in a horizontal plane between the span unit and the next adjacent span unit representing first, second, and third states of said units being within angularity limits, out of angularity limits and correcting, and out of safety limits respectively; a flexible control rod mounted on the adjacent span unit biased in a normal position and having a free end moving in the horizontal plane in relation to the span unit in response to changes in angularity between the two units; stop means mounted on the span unit and adapted to allow the free end of the control rod to move in the horizontal plane when the angularity between the units is between the first state and the second state and to engage the free end when the angularity between the units is between the second state and the third state whereby with the free end engaged by the stop means the control rod is flexed from its normal position; and, connecting means carried by the control rod disposed between the point of mounting on the adjacent span unit and the free end having the actuator rod connected to the connecting means whereby the actuator rod is driven linearly when the free end is not engaged with the stop means and non-linearly when the free end is engaged with the stop means.

DESCRIPTION OF THE DRAWINGS:

FIG. 1 is a simplified drawing of a center pivot irrigation system as wherein the present invention is employed.

FIG. 2 is a detailed side-elevation of the angularity sensing means of the present invention.

FIG. 3 is a partial end-sectional view taken through the plane III—III of FIG. 2.

FIG. 4 is an orthographic view of the angularity sensing means of FIG. 2.

FIG. 5 is a chart depicting the switch spacing in a typical embodiment of the present invention.

FIG. 6 is a plan view of the control rod and actuator rod movement in the angularity sensing means of the present invention.

FIG. 7 is a partial side-sectional view taken through the plane VII—VII of FIG. 6.

FIG. 8 is a view taken through the plane VIII—VIII of FIG. 6.

DESCRIPTION OF THE PREFERRED EMBODIMENT:

Referring first fo FIG. 1, a center pivot irrigation system generally indicated as 10 is shown as comprising a center pivot 12 connected to a supply of water under pressure (not shown) to which is attached a plurality of interconnected, truss supported water carrying conduit section 14 mounted on carriage frames 16 having motor means 18 connected to drive wheels 20. Each water carrying conduit section 14 and its associated drive means comprising carriage frame 16, motor means 18, and drive wheels 20 is referred to as a "span unit". For ease of reference, the span units of FIG. 1 are designated by the primed numerals 22 with 22' being the span unit furthest from the center pivot 12 and span unit 22" being the next adjacent. Adjacent span units 22 are interconnected by a flexible joint 26 secured by clamps 28. Each motor means 18 is controlled by a motor control means 24. Each motor control means 24, in turn, is controlled by angularity sensing means generally indicated as 30.

The previously discussed action of the motor control means 24 can best be understood with reference to FIG. 5. FIG. 5 represents switch placement relative to angular displacement between adjacent span units 22' indicated horizontally from a center position. For example, with no angular displacement between adjacent span units 22, the motor control means is in a first state as represented by the line marked "CENTER". In the entire region of angular displacement represented by the horizontal line of FIG. 1 between the "FORWARD" activation point and "REVERSE" activation line the angular displacement between the adjacent units is considered to be within tolerance limits. With the sprinkler rotating in its forward direction, when the angular displacement between adjacent span units reaches the point indicated by "FORWARD", the associated motor means 18 is activated to move the span unit 22 forward thereby reducing the angularity between the two units. If the sprinkler system were operating in the reverse direction, the same action would take place with reference to the "REVERSE" activation point. Continued increase in the angularity between adjacent segments as represented by movement along the horizontal line away from the "CENTER" position towards the "SAFETY" activation points represents movement toward the safety limits in each direction. As previously stated, movement from the "CENTER" position toward the "FORWARD" or "REVERSE" position represents an angularity change of approximately .5 degrees. If activation were accomplished lineraly on a scale such as that represented by FIG. 5, the safety position would be reached at approximately 2 degrees of angularity. What is desired is to have the displacement between the "FORWARD" and "REVERSE" position behave in a linear manner and the displacement in the regions between "FORWARD" and "REVERSE" and the "SAFETY" activation points behave in a non-linear manner so as to compress a greater amount of representative angularity difference into a short linear distance between activation points.

Referring now to FIGS. 4 and 6, the proposed switch structure and method of actuation is shown. Within motor control means 24 a switch activation member 32 is mounted for linear movement as shown by the two arrows. While, in the embodiment shown, switch activation member 32 moves in a linear direction, switch activation member 32 could be mounted as well for pivotal movement about an axis with the switches to be described hereinafter mounted in a arcuate fashion. Switch activation member 32 includes magnet means 34. As shown in FIG. 6, switch activation member 32 is in a position which represents no angularity difference between adjacent span units ("CENTER" in FIG. 5). A pair of normally opened contact reed switches 36 are positioned along the path of travel of switch activation member 32 on either side of the zero angularity point. The zero angularity point corresponds to the "CENTER" point of FIG. 5 and the two switches 36 correspond to the "FORWARD" and "REVERSE" positions thereof respectively. The construction of switches 36 is shown in FIG. 7 wherein a pair of normally opened contacts 38 are so designed as to be brought into electrical contact one with the other only when they are placed within the field of magnet 34. A second pair of reed switches 40 having normally closed contacts 38' are positioned along the path of switch activation member 32 at points on opposite sides of the "CENTER" position at a distance further from said position that reed switches 36. Reed switches 40 are shown in FIG. 8. The contacts 38' thereof open when placed in a magnetic field. Reed switches 40 are employed as the "SAFETY" switches.

The construction of the angularity sensing means 30 used to move switch activation member 32 in the desired non-linear manner in response to changes in angularity between adjacent span units 22 is best understood with reference to FIGS. 2, 3, 4, and 6. The junction shown represents that occurring between the outboard span unit 22' and the next adjacent span unit 22" and is so marked numerically. In the discussion that follows, "span unit" refers to the span unit 22 the motor control means 24 of which is being controlled. "Adjacent span unit" refers to the next span unit 22 further from the center pivot 12 from the "span unit". Thus, in the junction shown in FIGS. 2 and 4, span unit 22" is the "span unit" and span unit 22' is the "adjacent span unit".

Mounting means generally indicated as 42 are provided on the adjacent span unit 22'. Mounting member 44 is rotatably journalled in bearing members 46 which are attached to bracket 48 which in turn is attached to conduit section 14 of adjacent span unit 22'. Pendulum means 50 are attached to mounting member 44 so as to maintain mounting member 44 in a constant reference position with respect to the gravitational effect of the earth. Hinge means 52 are connected to the end of mounting member 44 closest to span unit 22". A flexible control rod 54 is mounted to hinge means 52 on one end with a free end on the opposite end thereof passing through a hole 56 in bracket 58 attached to top member 60 of carriage frame 16. The positioning of the free end of control rod 54 within hole 56 of bracket 58 is best understood with reference to FIG. 3.

As shown in FIG. 3, control rod 54 is positioned where it is located when no angularity exists between span unit 22' and adjacent span unit 22'. As the angularity between the span units 22' and 22" increases in either direction, control rod 54 is free to move within the confines of hole 56 in its normal, or unflexed, state. This freedom of movement is indicated by the two positions marked A and B of FIG. 6. As the angularity between the two span units 22' and 22" increases, control rod 54 eventually comes in contact with a side of hole 56 and is restrained from further free movement. Thereafter, as rod 54 attempts to move angularly, it is restrained and pivots around the edge of the hole 56 causing rod 54 to flex in the manner shown in position C of FIG. 6. The flexing action of control rod 54 between position B and C is non-linear in nature.

Connecting means 62 are attached to control rod 54 between the point of mounting to hinge means 52 and hole 56 in bracket 58. An actuator rod 64 is connected between connecting means 52 and switch activation member 32. The amount of movement of switch activation member 32 in response to movement of control rod 54 between positions B and C is determined by the size and material of control rod 54 (which determines the degree of flexure thereof) as well as the placement of connecting means 62 relative to the point of maximum flexure of control rod 54. As shown in FIG. 6, actuator rod 64 is connected to the point of maximum flexure of control rod 54 and would, therefore, be subject to the maximum amount of movement possible. In the preferred embodiment, connecting means 62 is mounted on control rod 54 between stop collars 66 to allow connecting means 62 to rotate about the longitudinal axis of control rod 54 to assure freedom of movement of the parts.

Thus, it can be seen that the present invention has provided a non-linear control system to be employed in center pivot sprinkler systems providing high sensitivity to the two switches controlling motor operation and lower sensitivity to the two switches provided for system shutdown within a reduced spacial orientation. As shown in FIG. 5, the switch position dimensions if a typical unit as built and tested are 0.020 and 0.125 inches from CENTER for motor operation and safety shutdown respectively. The ratio of the distances is 6:1. In prior art apparatus, this ratio was typically on the order of 20:1 to achieve the same operational characteristics.

Having thus described my invention, I claim:

1. In a center pivot irrigation system having a plurality of self-propelled articulated span units mounting interconnected sections of water carrying conduit, each such span unit having motor means and motor control means for regulating the operation of the associated motor means to maintain the span units in a pre-determined relative alignment wherein the control means includes angularity sensor means connected between each span unit and an adjacent span unit and associated with the motor control means of the span unit for sensing changes in angularity between the span unit and the adjacent span unit relative to the longitudinal extent thereof only in a horizontal plane having a control arm mounted on the adjacent span unit having a free end thereof engaging an actuator rod associated with the motor control means to operate with the latter upon changes in horizontal angularity between the units, the improvement for providing non-linear actuation of the motor control unit comprising:

(a) a control arm mounted on the adjacent span unit flexible over the length thereof in the horizontal plane, spring biased to a normal position and having a free end;

(b) means for attaching the actuator rod to said arm disposed intermediate the point of mounting said control arm and the free end thereof; and, (c) stop means mounted on the span unit for pivotally stopping the movement of said free end at a point in the horizontal travel thereof in response to horizontally angular displacement between adjacent units beyond which non-linear movement of the actuator rod is desired in response to continued horizontal angular displacement between the units.

2. The improvement to the control system of an irrigation system claimed in claim 1 wherein:

said control arm is a flexible rod.

3. In a center pivot irrigation system having a plurality of self-propelled articulated span units mounting interconnected sections of water carrying conduit each such span unit having motor means and motor control means for regulating the operation of the associated motor means to maintain said span units in a pre-determined relative alignment, improved motor control actuator means comprising:

(a) an actuator rod connected to the motor control means to operate the latter by moving between a first position wherein power to the motor means is off, a second position wherein power to the motor means is on, and a third position wherein power to the motor means of all span units is disabled, said positions being associated with the angularity only in a horizontal plane between the span unit and the next adjacent span unit representing first, second, and third states of said units being within angularity limits, out of angularity limits and correcting, and out of safety limits respectively;

(b) a flexible control rod mounted on the adjacent span unit biased in a normal position and having a free end moving in the horizontal plane in relation to the span unit in response to changes in angularity between the two units;

(c) stop means mounted on the span unit and adapted to allow said free end of said control rod to move in the horizontal plane when the angularity between the units is between said first state and said second state and to engage said free end when the angularity between the units is between said second state and said third state whereby with said free end engaged by said stop means said control rod is flexed from its normal position; and, (d) connecting means carried by said control rod disposed between the point of mounting on the adjacent span unit and said free end, said actuator rod being connected to said connecting means.

4. The improved motor control actuator means claimed in claim 3 wherein:

said actuator rod carries magnet means for actuating switch means within the motor control unit at said second and third positions.

5. The improved motor control actuator means claimed in claim 3 wherein said control rod is mounted with mounting means comprising:

(a) a mounting member rotatably journalled on the adjacent span unit to rotate about an axis parallel to a longitudinal axis of the adjacent span unit;

(b) pendulum means attached to said mounting member to maintain said member in a pre-determined attitude relative to the true vertical during rotative motion of the adjacent span unit; and, (c) hinge means on an end of said mounting member and connected to said control rod for mounting said control rod about an horizontal axis which is maintained horizontal during rotative motion of the adjacent span unit relative to a longitudinal axis thereof.

6. In a center pivot irrigation system having a plurality of self-propelled articulated span units mounting interconnected sections of water carrying conduit, each such span unit having motor means and motor control means for regulating the operation of the associated motor means to maintain the span units in a pre-determined relative alignment wherein the motor control means includes angularity sensor means connected between each span unit and an adjacent span unit for sensing changes in angularity between the span unit and the adjacent span unit relative to the longitudinal extent thereof and also includes first switch means and second switch means connected in series between said motor means and a source of power therefore as well as including switch actuator means for activating said first and second switch means movable between a plurality of positions to activate said first and second switch means to operate the motor means in the desired manner, the improvement comprising:

means connected between the angularity sensor means and said switch actuator means for moving said switch actuator means between respective ones of said plurality of positions in a non-linear manner in response to linear changes in angularity between the span unit and the adjacent span unit.

7. The improvement to irrigation system motor control means claimed in claim 6 wherein:

said switch actuator moving means is adapted to move said switch actuator means linearly between a first position and a second position of said plurality of positions and non-linearly between said second position and a third position of said plurality of positions, whereby the required movement of said switch actuator means between said second and third positions in response to a large change in angularity between the span units can be minimized.

8. The improvement to irrigation system motor control means claimed in claim 6 wherein:

(a) the first switch means is a normally open switch and the second switch means is a normally closed switch;

(b) the switch actuator means for activating said first and second switch means is movable between a first position where both switches are in their normal position, a second position where both switches are closed, and a third position where both switches are open; and, (c) said switch actuator moving means is adapted to move said switch actuator means linearlly between said first position and said second position and non-linearly between said second position and said third position whereby the required movement of said switch actuator means between said second and third positions in response to a large change in angularity between the span units can be minimized.

9. In a center pivot irrigation system having a plurality of self-propelled articulated span units mounting interconnected sections of water carrying conduit, each span unit having motor means and motor control means including a movable actuator for regulating the operation of the associated motor means, the improvement for maintaining the span units in a pre-determined relative alignment comprising:

(a) angularity sensor means connected between each span unit and an adjacent span unit for sensing changes in angularity between the span unit and the adjacent span unit relative to the longitudinal extent thereof only in a horizontal plane; and, (b) non-linear actuator control means connected between said angularity sensor means and the movable actuator for moving the actuator in a non-linear manner in response to linear changes in angularity between the span unit and the adjacent span unit.

* * * * *